United States Patent
Dudar (10) Patent No.: US 10,641,214 B2
(45) Date of Patent: May 5, 2020

(54) SYSTEM AND METHOD FOR DIAGNOSING AN EGR SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 15/898,013

(22) Filed: Feb. 15, 2018

(65) Prior Publication Data

US 2019/0249629 A1    Aug. 15, 2019

(51) Int. Cl.

| F02B 37/10 | (2006.01) |
|---|---|
| F02B 39/10 | (2006.01) |
| F02M 26/02 | (2016.01) |
| F02P 5/15 | (2006.01) |
| F01N 3/02 | (2006.01) |
| F01N 11/00 | (2006.01) |
| F02M 26/49 | (2016.01) |
| F02D 41/22 | (2006.01) |

(Continued)

(52) U.S. Cl.
CPC ............. *F02M 26/49* (2016.02); *F01N 3/021* (2013.01); *F01N 11/00* (2013.01); *F01N 11/002* (2013.01); *F02B 37/10* (2013.01); *F02B 39/10* (2013.01); *F02D 41/221* (2013.01); *F02D 41/401* (2013.01); *F02M 26/02* (2016.02); *F02M 26/47* (2016.02); *F02P 5/15* (2013.01); *F01N 2560/08* (2013.01); *F01N 2560/14* (2013.01); *F01N 2900/08* (2013.01); *F01N 2900/1406* (2013.01); *F01N 2900/1411* (2013.01); *F02D 2041/228* (2013.01)

(58) Field of Classification Search
CPC ........ F02B 37/10; F02B 39/10; F02D 41/221; F02D 41/401; F02D 2041/228; F02M 26/49; F02M 26/02; F02M 26/47; F01N 3/021; F01N 11/002; F01N 11/00; F01N 2900/1411; F01N 2900/1406; F01N 2900/08; F01N 2560/08; F01N 2560/14
USPC ....................................................... 60/605.2
See application file for complete search history.

(56) References Cited

U.S. PATENT DOCUMENTS

| 6,711,492 B1 | 3/2004 | Pursifull et al. |
| 6,850,833 B1 | 2/2005 | Wang et al. |

(Continued)

OTHER PUBLICATIONS

Dudar, A., "Systems and Methods for a Variable Displacement Engine," U.S. Appl. No. 15/468,013, filed Mar. 23, 2017, 74 pages.

(Continued)

*Primary Examiner* — Patrick D Maines
*Assistant Examiner* — Dapinder Singh
(74) *Attorney, Agent, or Firm* — Geoffrey Brumbaugh; McCoy Russell LLP (57) ABSTRACT

Methods and systems for diagnosing operation of an exhaust gas recirculation system of an internal combustion engine are described. In one example, the EGR system is diagnosed while an engine that includes the EGR system is not rotating and combusting fuel. The EGR system is diagnosed when the engine is not operating so that vehicle passengers are not disturbed by the diagnostic and so that flow estimates through the EGR system may not be disturbed by pressure changes that may be related to combustion within the engine.

20 Claims, 5 Drawing Sheets

(51) Int. Cl.
    *F02M 26/47*    (2016.01)
    *F01N 3/021*    (2006.01)
    *F02D 41/40*    (2006.01)

(56) References Cited

U.S. PATENT DOCUMENTS

| | | |
|---|---|---|
| 7,159,551 B2 | 1/2007 | Cecur et al. |
| 7,240,663 B2 | 7/2007 | Lewis et al. |
| 7,404,383 B2 | 7/2008 | Elendt |
| 7,631,552 B2 | 12/2009 | Keski-Hynnila et al. |
| 8,224,559 B2 * | 7/2012 | Chang ................. F02D 41/0087 123/479 |
| 8,424,288 B2 * | 4/2013 | De Tricaud ............. F01N 3/103 60/278 |
| 9,347,417 B2 * | 5/2016 | Shomura ................. F02N 19/00 |
| 9,605,603 B2 | 3/2017 | Glugla et al. |
| 2017/0241321 A1 | 8/2017 | Yoo et al. |
| 2018/0066595 A1 | 3/2018 | Dudar et al. |

OTHER PUBLICATIONS

Dudar, A., "Systems and Methods for a Variable Displacement Engine," U.S. Appl. No. 15/659,319, filed Jul. 25, 2017, 65 pages.

* cited by examiner

SYSTEM AND METHOD FOR DIAGNOSING AN EGR SYSTEM

BACKGROUND/SUMMARY

A gasoline or diesel engine may include an exhaust gas recirculation (EGR) system to reduce engine NOx emissions and improve vehicle fuel economy. The EGR system may recirculate exhaust gas from an exhaust manifold to an engine intake manifold to dilute charge entering the engine with inert gas. The recirculated exhaust gas may reduce temperatures within engine cylinders to reduce NOx formation. Further, since at least a portion of the recirculated exhaust gas does not participate in combustion within the engine cylinders, the engine may be operated at higher intake manifold pressures, thereby reducing engine pumping losses. However, if the amount of EGR entering engine cylinders is too great, cylinders of the engine may misfire, thereby increasing engine emissions and reducing engine torque output. Therefore, it may be desirable to receive feedback from a sensor that indicates the amount of EGR entering the engine.

One way to determine EGR flow to the engine is to measure a pressure drop across a sharp edge orifice in path between an engine exhaust manifold and an engine intake manifold. The pressure drop may be converted into an EGR flow rate that may be used via a controller to adjust a position of an EGR valve to provide a desired EGR flow rate to the engine. Yet, because exhaust gas may contain soot and other compounds that may accumulate in the exhaust system, it may be possible for the EGR flow sensor to become clogged with matter or for the EGR orifice to become clogged with matter such that the output of the EGR sensor is degraded with respect to reflecting an actual EGR flow rate through the EGR system. Further, if the EGR valve is opened and closed to ascertain EGR system functionality, vehicle occupants may notice a rough running engine. Further still, pressure changes in the exhaust system due to combustion in the engine may influence EGR flow measurements. Therefore, it may be desirable to have a way of diagnosing an EGR system that may determine the presence or absence of EGR system degradation without disturbing vehicle occupants and combustion within the engine.

The inventor herein has recognized the above-mentioned disadvantages and has developed an engine operating method, comprising: increasing air flow through an engine that is not rotating via a controller in response to a request to diagnose operation of an exhaust gas recirculation (EGR) system.

By increasing air flow through an engine that is not rotating, it may be possible to provide the technical result of ascertaining the presence or absence of EGR system degradation without disturbing vehicle occupants or engine emissions. In one example, an electrically driven compressor may be activated to increase air flow through an engine that is not rotating. If air flow through the engine as observed by a particulate filter differential pressure sensor and flow through the engine as observed by an EGR system differential pressure sensor are in agreement, it may be judged that the EGR system is operating in a desired way. However, if air flow through the engine as observed by the particulate filter differential pressure sensor is not in agreement with air flow through the engine as observed by the EGR system differential pressure sensor, then it may be judged that the EGR system is degraded.

The present description may provide several advantages. In particular, the approach may be used to diagnose EGR system operation without disturbing vehicle occupants or degrading vehicle emissions. In addition, the approach may be implemented without increasing system cost. Further, the approach may distinguish between EGR sensor degradation and EGR valve degradation so as to improve diagnostics and reduce rework costs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
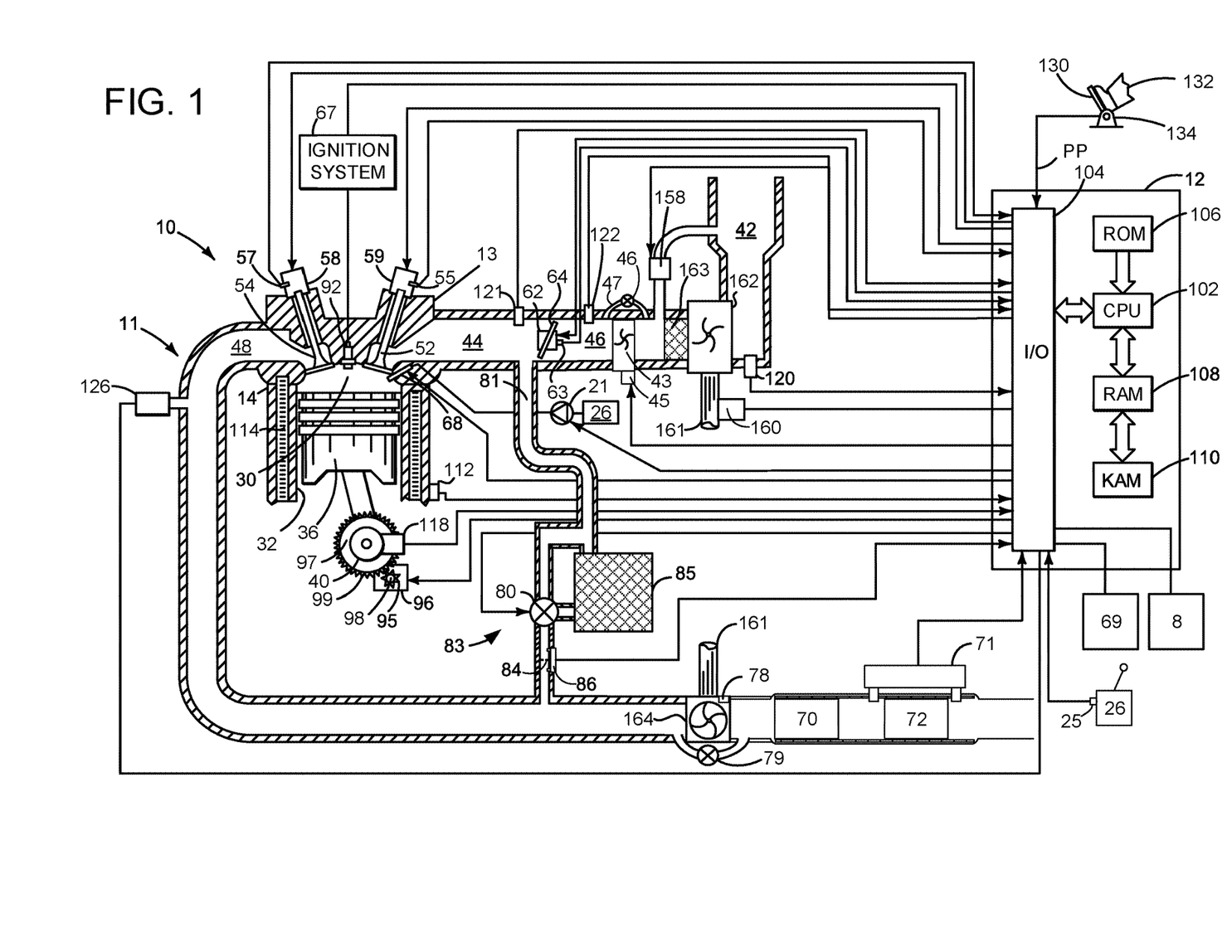
FIG. 1 shows a schematic depiction of an example engine.
Figure 2:
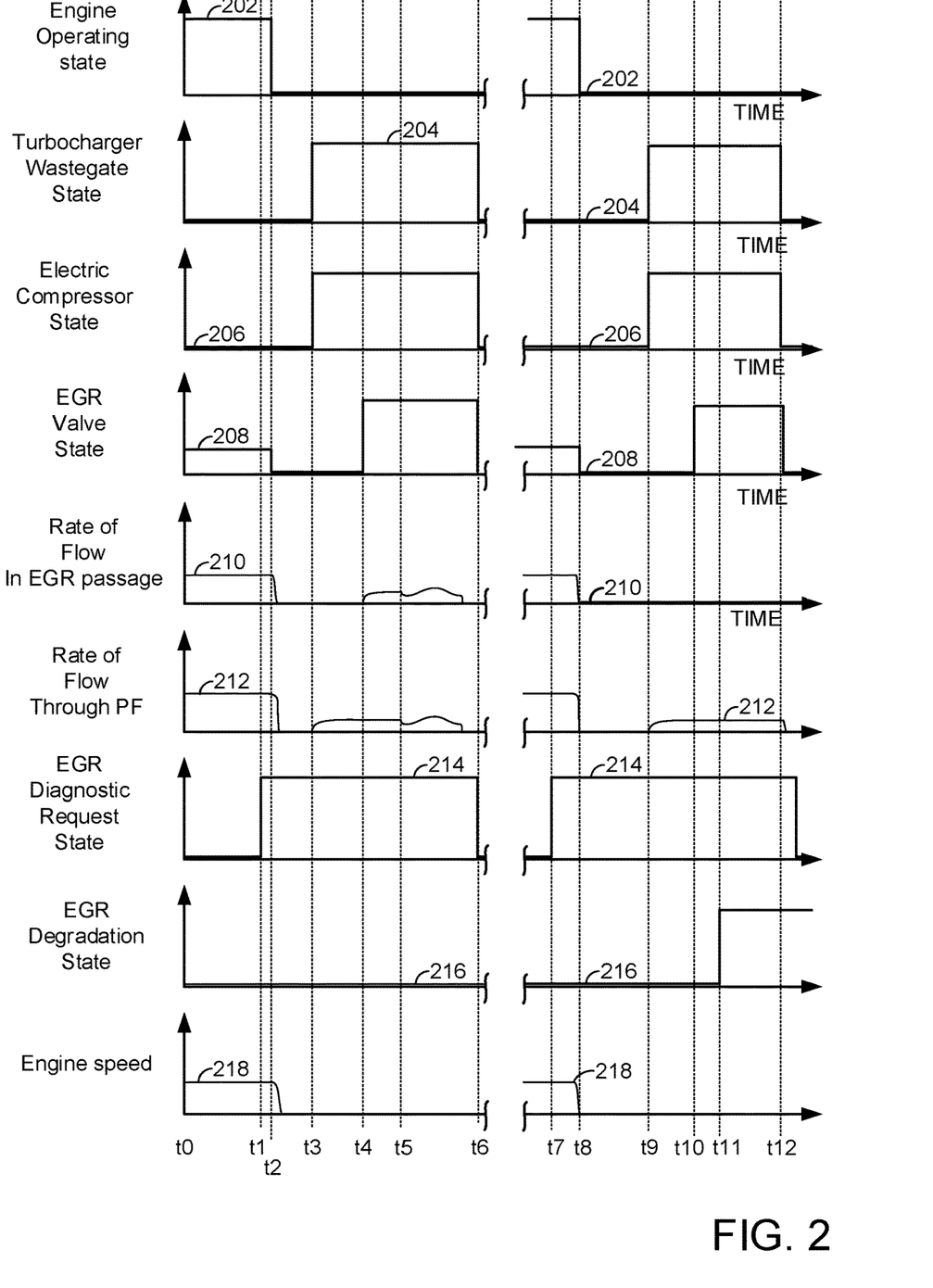
FIG. 2 shows a prophetic engine operating sequence according to the method of FIGS. 3-5.

The present description is related to operating an engine that includes an EGR system. FIG. 1 shows an example engine that includes an EGR system for reducing engine emissions. The engine of FIG. 1 may be operated as is shown in FIG. 2 to diagnose the presence or absence of EGR system degradation. The engine may be operated according to the method shown in FIGS. 3-5 to diagnose the engine's EGR system. The method of FIGS. 3-5 may be performed while a vehicle is parked and absence occupants so that it may be performed without objection.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Intake poppet valve 52 may be operated by a variable valve activating/deactivating actuator 59, which may be an electrical valve operator (e.g., as shown in U.S. Pat. No. 7,240,663 which is hereby fully incorporated by reference for all purposes) or a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may be an electrical valve operator (e.g., as shown in U.S. Pat. No. 7,240,663 which is hereby fully incorporated by reference for all purposes) or a cam driven valve operator (e.g., as shown in U.S. Pat. Nos. 9,605,603; 7,404,383; and 7,159,551 all of which are hereby fully incorporated by reference for all purposes). The position of intake valve 52 may be determined by sensor 55. The position of exhaust valve 54 may be determined by sensor 57.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, and fuel rail (not shown).

Intake manifold 44 is shown communicating with optional electronic throttle 62 which adjusts a position of throttle plate 64 to control air flow from intake boost chamber 46. Optional turbocharger compressor 162 draws air from air intake 42 to supply boost chamber 46. A charge air cooler 163 may be provided downstream of compressor 162. Exhaust gases spin turbine 164 which is coupled to compressor 162 via shaft 161. Alternatively, optional electric machine (e.g., motor) 160 may rotate shaft 161 and compressor 162. Compressor speed may be adjusted via adjusting a position of variable vane control 78, adjusting a position of compressor bypass valve 158, or adjusting current supplied to electric machine 160. In alternative examples, a wastegate 79 may replace or be used in addition to variable vane control 78. Variable vane control 78 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve allow exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Optional electrically driven compressor 43 may be rotated via electric machine 45 in response to commands provided by controller 12. Electrically driven compressor 43 may be present when electric machine 160 is absent. Electrically driven compressor 43 may be activated when exhaust flow from the engine is low so as to increase the amount of air flowing into engine 10 when exhaust flow through turbine 164 is low or when engine 10 does not include turbine 164 and compressor 162. Electrically driven compressor 43 may be bypassed via passage 47 by opening electric compressor bypass valve 46.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

An engine start may be requested via human/machine interface 69 or in response to vehicle operating conditions (e.g., brake pedal position, accelerator pedal position, battery SOC, etc.). Controller 12 may also provide status information (e.g., indications of degradation or required maintenance) or receive input via human/machine interface 69. Human/machine interface 69 may be a touch screen panel, pushbutton interface, or other type of interface. Battery 8 may supply electrical power to starter 96, electric machine 87, and electric machine 160. Controller 12 may monitor battery state of charge.

Exhaust gas recirculation (EGR) may be provided to the engine via high pressure EGR system 83. High pressure EGR system 83 includes EGR valve 80, EGR passage 81, and EGR cooler 85. EGR valve 80 is a valve that closes or allows exhaust gas to flow from upstream of emissions device 70 to a location in the engine air intake system downstream of compressor 162. EGR may bypass EGR cooler 85, or alternatively, EGR may be cooled via passing through EGR cooler 85. EGR system also includes a sharp edge orifice 84 and an EGR differential pressure sensor 86. EGR differential pressure sensor 86 senses a pressure difference across sharp edge orifice 84 to determine flow through EGR passage 81.

Distributorless ignition system 67 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70 in exhaust system 11. Alternatively, a two-state exhaust gas oxygen sensor may be substituted for UEGO sensor 126. Engine exhaust system 11 includes exhaust manifold 48, converter 70, particulate filter 72, and particulate filter differential pressure sensor 71. Converter 70 can include multiple catalyst bricks, in one example. In another example, multiple emission control devices, each with multiple bricks, can be applied. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a measurement of engine manifold absolute pressure (MAP) from pressure sensor 121 coupled to intake manifold 44; a measurement of engine boost pressure from pressure sensor 122; an engine position signal from a Hall effect sensor 118 sensing crankshaft 40 position; a measurement of air mass entering the engine from sensor 120 (e.g., mass air flow sensor); and a measurement of throttle position from sensor 63. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also interface with a transmission (not shown). Controller may also determine an operating state (e.g., park, neutral, drive, reverse) of the transmission and transmission shifter 26 via transmission shifter position sensor 25.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The system of FIG. 1 provides for an engine system, comprising: an engine including a plurality of cylinders, a plurality of valve deactivating mechanisms, and an exhaust gas recirculating (EGR) system; an electrically driven compressor; and a controller including executable instructions stored in non-transitory memory to increase air flow through the engine via the electrically driven compressor while the engine is not rotating via the controller in response to a request to diagnose the EGR system. The engine system further comprises additional instructions to close an EGR valve and adjust the engine to allow air flow through one or more of the plurality of cylinders via the controller in response to the request to diagnose the EGR system. The engine system further comprises additional instructions to open the EGR valve and adjust the engine to prevent air flow through the plurality of cylinders via the controller in response to air flow being detected through a particulate filter while the intake and exhaust valves of the at least one cylinder are simultaneously open and the engine is not rotating. The engine system further comprises additional instructions to adjust the plurality of valve deactivating mechanisms to prevent air flow through the plurality of cylinders via the controller. The engine system further comprises additional instructions to adjust engine operation via the controller in response to EGR system degradation determined via the controller. The engine system includes where adjust engine operation includes retarding spark timing or adjusting fuel injection timing.

Referring now to FIG. 2, an example prophetic engine operating sequence for an engine is shown. The operating sequence of FIG. 2 may be produced via the system of FIG. 1 executing instructions of the method described in FIGS. 3-5. The plots of FIG. 2 are aligned in time and occur at the same time. Vertical markers at t0-t12 indicate times of particular interest during the sequence. The horizontal axis includes a break in time that is indicated between the two SSs located along each horizontal axis. The duration of the break in time may be long or short.

Figure 4:
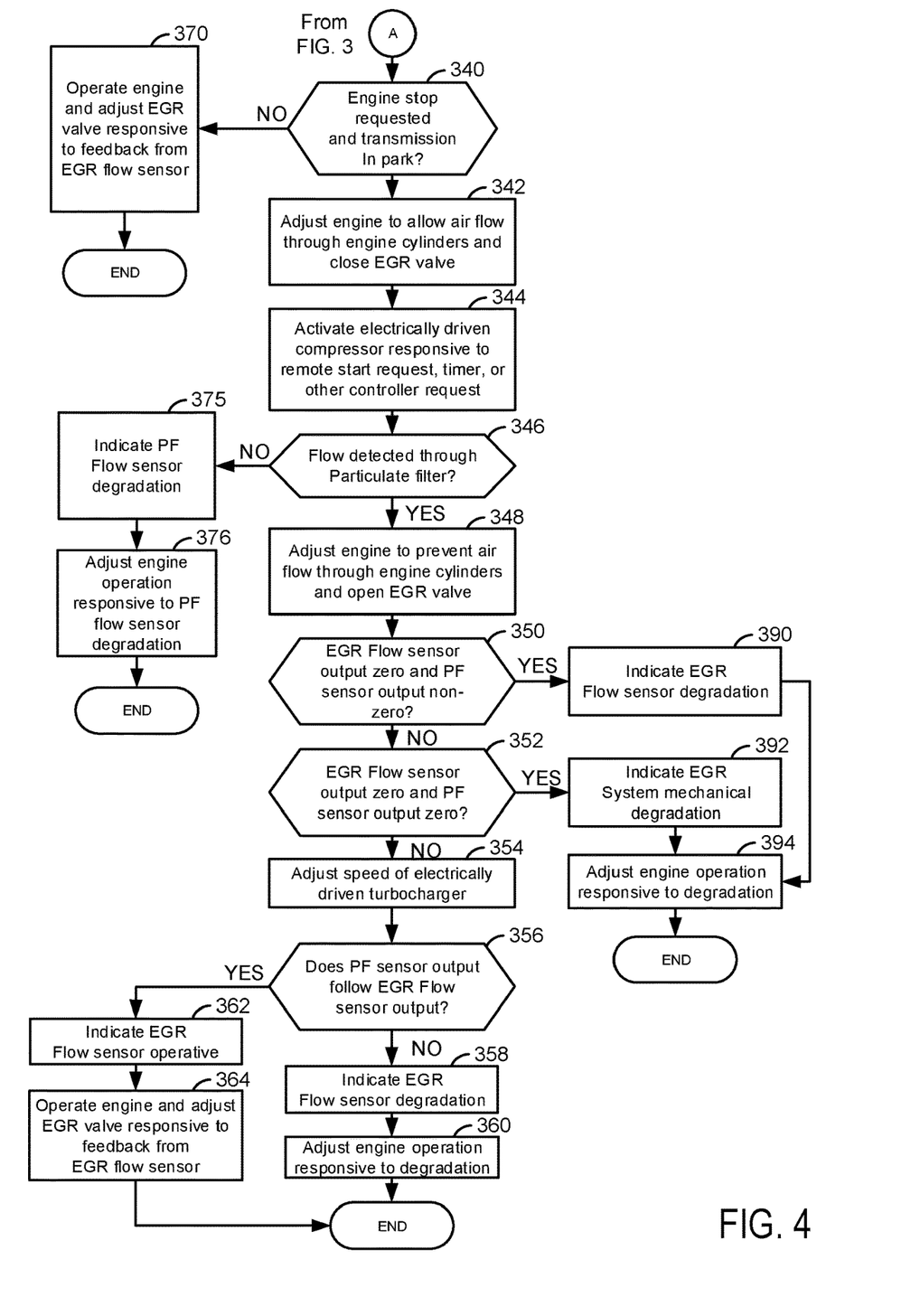

The first plot from the top of FIG. 4 represents engine operating state versus time. The vertical axis represents engine operating state. The engine is combusting fuel and rotating when trace 202 is at a higher level near the vertical axis arrow. The engine is not combusting fuel when trace 202 is at a lower level near the horizontal axis. The horizontal axis represents time and time increases from the left side of the plot to the right side of the plot. Trace 202 represents the engine operating state.

The second plot from the top of FIG. 2 represents turbocharger wastegate operating state versus time. The vertical axis represents turbocharger wastegate operating state and the turbocharger wastegate is fully open when trace 204 is at a higher level near the vertical axis arrow. The wastegate is fully closed when trace 204 is at a lower level near the horizontal axis. The horizontal axis represents time and time increases from the left hand side of the plot to the right hand side of the plot. Trace 204 represents turbocharger wastegate state.

The third plot from the top of FIG. 2 represents the operating state of the electrically driven compressor, or alternatively, the operating state of the electric machine that rotates the turbocharger compressor, versus time. The vertical axis represents electrically driven compressor operating state and the electrically driven compressor is on (e.g., consuming electric power) and rotating the compressor when trace 206 is at a higher level near the vertical axis arrow. The electrically driven compressor is off (e.g., not consuming electric power) when trace 206 is at a lower level near the horizontal axis. The horizontal axis represents time and time increases from the left hand side of the plot to the right hand side of the plot. Trace 206 represents electrically driven compressor operating state.

The fourth plot from the top of FIG. 4 represents EGR valve state versus time. The vertical axis represents EGR valve state and the EGR valve is fully open when trace 208 is near the vertical axis arrow. The EGR valve is fully closed when trace 208 is near the horizontal axis. The horizontal axis represents time and time increases from the left hand side of the plot to the right hand side of the plot. Trace 208 represents EGR valve state.

The fifth plot from the top of FIG. 2 represents rate of flow of gases (e.g., EGR or air) in the EGR passage versus time. The vertical axis represents rate of flow of gases in the EGR passage and the rate of flow increases in the direction of the vertical axis arrow. The horizontal axis represents time and time increases from the left hand side of the plot to the right hand side of the plot. Trace 210 represents rate of flow of gases in the EGR passage.

The sixth plot from the top of FIG. 2 represents rate of flow of gases (e.g., EGR or air) through the particulate filter (PF) versus time. The vertical axis represents rate of flow of gases through the particulate filter and the rate of flow increases in the direction of the vertical axis arrow. The horizontal axis represents time and time increases from the left hand side of the plot to the right hand side of the plot. Trace 212 represents rate of flow of gases through the particulate filter.

The seventh plot from the top of FIG. 2 represents EGR diagnostic request state versus time. The vertical axis represents EGR diagnostic request state and an EGR diagnostic is requested when the EGR diagnostic request state trace is at a higher level near the vertical axis arrow. An EGR diagnostic is not requested when the EGR diagnostic request state trace is at a lower level near the horizontal axis. The horizontal axis represents time and time increases from the left hand side of the plot to the right hand side of the plot. Trace 214 represents the EGR diagnostic request state.

The eighth plot from the top of FIG. 2 represents EGR degradation state versus time. The vertical axis represents EGR degradation state and EGR system degradation is present when the EGR degradation state trace is at a higher level near the vertical axis arrow. EGR system degradation is not present when the EGR degradation state trace is at a lower level near the horizontal axis. The horizontal axis represents time and time increases from the left hand side of the plot to the right hand side of the plot. Trace 216 represents the EGR degradation state.

The ninth plot from the top of FIG. 2 represents engine rotational speed versus time. The vertical axis represents engine rotational speed and engine rotational speed increases in the direction of the vertical axis arrow. The horizontal axis represents time and time increases from the left hand side of the plot to the right hand side of the plot. Trace 218 represents engine speed.

At time t0, the engine is combusting fuel and at a middle level speed. The turbocharger wastegate is closed and the electrically driven compressor is not activated. The EGR valve is partially open. The EGR flow rate is at a lower middle level and flow through the particulate filter is at a lower middle level. The EGR diagnostic is not requested and EGR system degradation is not indicated.

At time t1, an EGR system diagnostic is requested based on vehicle operating conditions. The engine continues to combust fuel and it operates at a middle level speed. The turbocharger wastegate remains closed and the electrically driven compressor is not activated. The EGR valve is partially open. The EGR flow rate is at a lower middle level and flow through the particulate filter is at a lower middle level. The EGR system degradation is not indicated.

At time t2, the engine is ceases combustion fuel and it begins to decelerate. The EGR valve is closed in response to stopping combustion in the engine and the EGR flow rate begins to decrease. The turbocharger wastegate remains closed and the electrically driven compressor is not activated. The flow through the particulate filter also begins to decrease. The EGR diagnostic request remains asserted and EGR system degradation is not indicated.

Between time t2 and time t3, the engine is not combusting fuel and engine speed is reduced to zero. The engine is stopped at a position where intake and exhaust valves of at least one cylinder are simultaneously held in an open position (not shown) when engine rotational speed is zero. This allows air to be pumped through the engine while the EGR valve is closed so that operation of the particulate filter differential pressure sensor may be confirmed. The engine stopping position may be adjusted via an electric machine. The turbocharger wastegate remains closed and the electrically driven compressor remains off. The EGR valve remains closed and the EGR rate is reduced to zero. Flow through the particulate filter is also reduced to zero and the EGR diagnostic request remains asserted. EGR system degradation is not indicated.

At time t3, the engine remains stopped at a position where intake and exhaust valves of at least one cylinder are simultaneously held in an open position and the turbocharger wastegate is fully opened to allow air flow past the turbocharger turbine. The electrically driven compressor is activated to increase air flow through the engine and the EGR valve is held fully closed to prevent air flow through the EGR passage. The EGR flow rate is zero and the flow rate trough the particulate filter begins to increase. The EGR diagnostic state is asserted and EGR system degradation is not indicated.

Between time t3 and time t4, the engine remains stopped and the turbocharger wastegate remains fully opened. Air flow through engine is provided by the activated electrically driven compressor and the EGR valve is held fully closed to prevent air flow through the EGR passage. The EGR flow rate is zero and the flow rate trough the particulate filter is at a lower level, which verifies operation of the particulate filter differential pressure sensor since flow through the particulate filter is not zero. The EGR diagnostic state is asserted and EGR system degradation is not indicated.

At time t4, the engine remains stopped and the turbocharger wastegate is fully open. The electrically driven compressor remains activated and the EGR valve is fully opened to allow air flow through the EGR passage. The engine is also adjusted so that there are no simultaneously held open intake valves and exhaust valves (not shown). The engine may be adjusted via rotating the engine or specifically closing intake and/or exhaust valves (not shown). In other words, exhaust valves and/or intake valves of each cylinder are fully closed to prevent air flow through the engine. This equalizes air flow through the EGR passage and the particulate filter so that output of the EGR differential pressure sensor may be compared to output of the particulate filter differential pressure sensor. The EGR flow rate increases and the particulate filter flow rate remains at its previous level. The EGR diagnostic state is asserted and EGR system degradation is not indicated.

Between time t4 and time t5, the engine remains stopped and the turbocharger wastegate is fully open. The electrically driven compressor remains activated and the EGR valve is fully opened to allow air flow through the EGR passage. The EGR flow rate is non-zero and the particulate filter flow rate is non-zero indicating flow through the EGR passage and the particulate filter. The EGR diagnostic state is asserted and EGR system degradation is not indicated because air flow through the EGR passage is indicated.

At time t5, the engine remains stopped and the turbocharger wastegate is fully open. Speed of the electrically driven compressor is varied (not shown) to determine if the flow rate through the EGR passage and flow rate through the particulate filter track each other in accord with the changing speed of the electrically driven compressor. The EGR valve remains fully opened to allow air flow through the EGR passage. The EGR flow rate and the particulate filter flow rate begin changing in response to the change in the speed of the electrically driven compressor. The EGR diagnostic state is asserted and EGR system degradation is not indicated.

Between time t5 and time t6, the engine remains stopped and the turbocharger wastegate is fully open. The electrically driven compressor speed changes and the EGR valve is fully opened to allow air flow through the EGR passage. The EGR flow rate and the particulate filter flow rate change with the speed of the electrically driven compressor. The EGR diagnostic state is asserted and EGR system degradation is not indicated because air flow through the EGR passage is indicated.

At time t6, the EGR diagnostic request is withdrawn and the turbocharger wastegate and EGR valve are closed in response to the EGR diagnostic request being withdrawn. The electrically driven compressor is also deactivated in response to the EGR diagnostic request being withdrawn. The engine remains stopped and flow through the EGR passage and the particulate filter is zero. EGR system degradation is not indicated because the flow through the EGR passage correlated with flow through the particulate filter.

The sequence breaks between time t6 and time t7. The duration of the break may be long or short. The engine is shown combusting and rotating before time t7. The turbocharger wastegate is fully closed and the electric compressor is deactivated before time t7. The EGR valve is partially open and the rate of flow through the EGR passage is at a lower middle level before time t7. The rate of flow through the particulate filter is a middle level and the EGR diagnostic request is not asserted before time t7. EGR degradation is not indicated and engine speed is at a lower middle level before time t7.

At time t7, an EGR system diagnostic is requested based on vehicle operating conditions. The engine continues to combust fuel and it operates at a middle level speed. The turbocharger wastegate remains closed and the electrically driven compressor is not activated. The EGR valve is partially open. The EGR flow rate is at a lower middle level and flow through the particulate filter is at a lower middle level. The EGR system degradation is not indicated.

At time t8, the engine is ceases combustion fuel and it begins to decelerate. The EGR valve is closed in response to stopping combustion in the engine and the rate of flow in the EGR passage begins to decrease. The turbocharger wastegate remains closed and the electrically driven compressor is not activated. The rate of flow through the particulate filter also begins to decrease. The EGR diagnostic request remains asserted and EGR system degradation is not indicated.

Between time t8 and time t9, the engine is not combusting fuel and engine speed is reduced to zero. The engine is stopped at a position where intake and exhaust valves of at least one cylinder are simultaneously held in an open position (not shown) when engine rotational speed is zero. The engine stopping position may be adjusted via an electric machine. Alternatively, the intake and/or exhaust valves may be commanded fully open. The turbocharger wastegate remains closed and the electrically driven compressor remains off. The EGR valve remains closed and the flow rate through the EGR passage is reduced to zero. Flow through the particulate filter is also reduced to zero and the EGR diagnostic request remains asserted. EGR system degradation is not indicated.

At time t9, the engine remains stopped at a position where intake and exhaust valves of at least one cylinder are simultaneously held in an open position and the turbocharger wastegate is fully opened to allow air flow past the turbocharger turbine. The electrically driven compressor is activated to increase air flow through the engine and the EGR valve is held fully closed to prevent air flow through the EGR passage. The EGR flow rate is zero and the flow rate trough the particulate filter begins to increase. The EGR diagnostic state is asserted and EGR system degradation is not indicated.

Between time t9 and time t10, the engine remains stopped and the turbocharger wastegate remains fully opened. Air flow through engine is provided by the activated electrically driven compressor and the EGR valve is held fully closed to prevent air flow through the EGR passage. The EGR flow rate is zero and the flow rate trough the particulate filter is at a lower level, which verifies operation of the particulate filter differential pressure sensor since flow through the particulate filter is not zero. The EGR diagnostic state is asserted and EGR system degradation is not indicated.

At time t10, the engine remains stopped and the turbocharger wastegate is fully open. The electrically driven compressor remains activated and the EGR valve is fully opened to allow air flow through the EGR passage. The engine is also adjusted so that there are no simultaneously held open intake valves and exhaust valves (not shown). The engine may be adjusted via rotating the engine or specifically closing intake and/or exhaust valves (not shown). In other words, exhaust valves or intake valves of each cylinder are fully closed to prevent air flow through the engine. This may equalize air flow through the EGR passage and the particulate filter if the EGR system is operating as is desired so that output of the EGR differential pressure sensor may be compared to output of the particulate filter differential pressure sensor. However, in this example, the EGR flow rate does not increase and the particulate filter flow rate remains at its previous level. The EGR diagnostic state is asserted and EGR system degradation is not indicated.

Between time t10 and time t11, the engine remains stopped and the turbocharger wastegate is fully open. The electrically driven compressor remains activated and the EGR valve is fully opened to allow air flow through the EGR passage. The rate of flow through the EGR passage remains zero while the flow rate through the particulate filter flow rate is non-zero. This indicates that the EGR differential pressure sensor is degraded. The EGR system degradation state changes remains at a low level so that EGR system degradation is not reported until the system has time to react to opening of the EGR valve. The EGR diagnostic state is asserted.

At time t11, the engine remains stopped and the turbocharger wastegate is fully open. The electrically driven compressor remains activated and the EGR valve is fully opened to allow air flow through the EGR passage. However, the rate of flow through the EGR passage is still zero while the flow rate through the particulate filter flow rate is non-zero. Therefore, the EGR system degradation state changes from a low level to a higher level to indicate EGR system degradation. The EGR diagnostic state remains asserted.

At time t12, the EGR diagnostic request is withdrawn and the turbocharger wastegate and EGR valve are closed in response to the EGR diagnostic request being withdrawn. The electrically driven compressor is also deactivated in response to the EGR diagnostic request being withdrawn. The engine remains stopped and flow through the EGR passage and the particulate filter is zero. EGR system degradation is indicated because the flow through the EGR passage did not correlate with flow through the particulate filter.

In this way, operation of an EGR system may be diagnosed to determine the presence or absence of EGR system degradation, including EGR differential pressure sensor degradation. Air flow through the engine and EGR passages may first be verified by a particulate filter differential pressure sensor, then output of the EGR differential pressure sensor may be compared to output of the particulate filter differential pressure sensor. If output of the two sensors agrees, the system may be determined to be not degraded. If output of the two sensors does not agree, the EGR system may be determined to be degraded.

Figure 3:
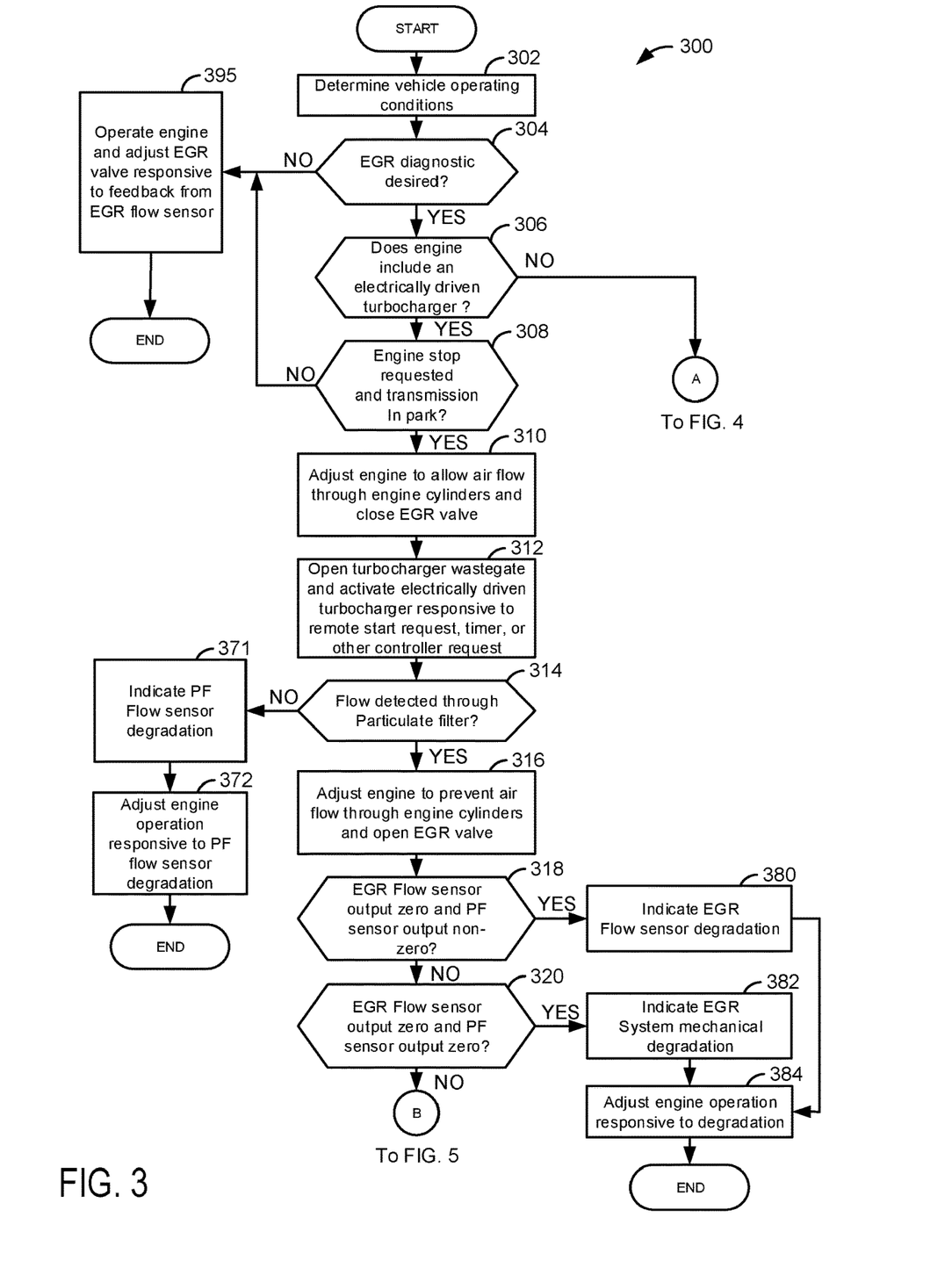
FIGS. 3-5 show an example method for operating an engine and diagnosing an EGR system.
Figure 5:
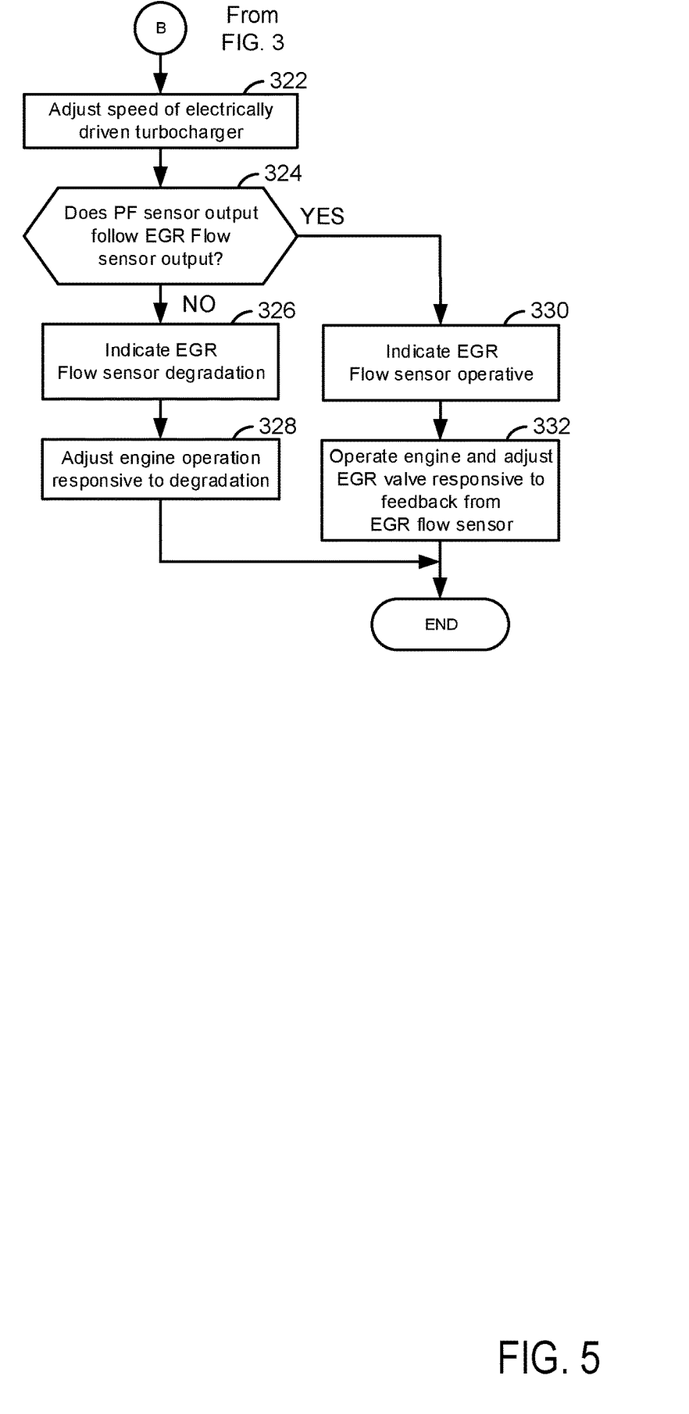

Referring now to FIGS. 3-5, a method for operating an engine is shown. In particular, a flowchart of a method for operating an internal combustion engine is shown. The method of FIGS. 3-5 may be stored as executable instructions in non-transitory memory in systems such as shown in FIG. 1. The method of FIGS. 3-5 may be incorporated into and may cooperate with the systems of FIG. 1. Further, at least portions of the method of FIGS. 3-5 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, method 300 may determine selected control parameters from sensor inputs. Further, controller instructions may be provided for operating an engine at all the engine operating conditions described herein.

At 302, method 300 determines vehicle operating conditions. Vehicle operating conditions may include but are not limited to engine temperature, accelerator pedal position, particulate filter soot loading, ambient temperature, ambient pressure, driver demand torque, and engine speed. Vehicle operating conditions may be determined via vehicle sensors and the engine controller described in FIG. 1.

At 304, method 300 judges if an EGR diagnostic is requested. An EGR diagnostic may be requested after engine misfire has been detected, the vehicle has traveled a predetermined distance, the engine has been combusting fuel for a predetermined amount of time, or other conditions. If method 300 judges that an EGR diagnostic is requested, the answer is yes and method 300 proceeds to 306. Otherwise, the answer is no and method 300 proceeds to 395.

At 395, method 300 operates the engine (e.g., combusts fuel in the engine) and adjusts a position of the engine's EGR valve responsive to engine speed, engine load, and feedback from the EGR system. For example, the EGR valve may be commanded to a position to provide a desired EGR flow rate, and then the position of the valve may be adjusted responsive to an observed or measured flow rate of EGR through the EGR passage. The observed rate of EGR flow may be determined from output of the EGR differential pressure sensor. Method 300 proceeds to exit after adjusting engine operation.

At 306, method 300 judges if the engine includes an electrically driven turbocharger. In one example, method 300 may judge that the engine includes an electrically driven turbocharger if a variable stored in controller non-transitory memory indicates that the present an electrically driven turbocharger. If the variable in memory indicates the presence of an electrically driven turbocharger, the answer is yes and method 300 proceeds to 308. If the variable stored in memory does not indicate the presence of an electrically driven turbocharger, the answer is no and method 300 proceeds to 322.

At 308, method 300 judges if an engine stop is requested and if the transmission is engaged in park. In one example, an engine stop may be requested via a human driver providing input to a key switch, pushbutton, or other human/machine interface that has a sole purpose of requesting an engine stop or start. Alternatively, an autonomous driver may request an engine stop via adjusting a value of a variable in controller memory. Similarly, method 300 may judge if the vehicle's transmission is engaged in park via determining a position of a shifter via a sensor. If method 300 judges that an engine stop is requested and the vehicle's transmission is engaged in park, the answer is yes and method 300 proceeds to 310. Otherwise, the answer is no and method 300 proceeds to 395.

At 310, method 300 adjusts the engine to allow air flow through engine cylinders. In one example, the position of the engine may be adjusted so that one or more of the engine's cylinders intake and exhaust valves are simultaneously open to allow air to flow through the cylinder and out the exhaust system. The engine may be rotated to a position where at least one or more engine cylinder's intake and exhaust valves are simultaneously open. Alternatively, intake and/or exhaust valves may be commanded open simultaneously via variable valve actuators to allow air to flow through the engine's cylinders. Method 300 also fully closes the EGR valve so that air is not allowed to flow through the EGR passage. Method 300 proceeds to 312.

At 312, method 300 fully opens the turbocharger wastegate and activates the electrically driven turbocharger. The wastegate may be opened and the electrically driven turbocharger activated in response to a human driver remotely requesting an engine start, a predetermined amount of time since the engine was most recently stopped (e.g., not combusting fuel), or via a request from an autonomous controller. The electrically driven turbocharger may be commanded to a speed that provides a threshold amount of air flow through the engine. Method 300 proceeds to 314.

At 314, method 300 judges if air flow from the electrically driven turbocharger is detected through the particulate filter via the particulate filter differential pressure sensor. Flow through the particulate filter may be determined in a variety of ways from output of the particulate filter differential pressure sensor. In one example, flow through the particulate filter may be estimated via the following equation:

$$PF_{flow} = f(\Delta P, T, SL, \rho)$$

where $PF_{flow}$ is the estimated flow rate of air through the particulate filter; f is a function with arguments $\Delta P$, T, SL, and $\rho$; $\Delta P$ is pressure drop across the particulate filter, T, is air temperature, SL is the estimated soot load in the particulate filter, and $\rho$ is the density of air. Alternatively, flow through the particulate filter may be determined as a face velocity of a particulate filter $U_f$ using $\Delta P$ as is described in U.S. Pat. No. 8,069,658, which is hereby fully incorporated by reference for all intents and purposes. If method 300 detects flow through the particulate filter, the answer is yes and method 300 proceeds to 316. Otherwise, the answer is no and method 300 proceeds to 371.

At 371, method 300 indicates particulate filter flow sensor degradation. Further, method 300 may indicate possible electrically driven turbocharger degradation since no flow was detected at the particulate filter. Method 300 may indicate particulate filter flow sensor degradation via displaying a message on a human/machine interface, changing a value of a variable stored in controller memory, or via other known ways. Method 300 proceeds to 372.

At 372, method 300 adjusts engine operation responsive to the indication of particulate filter (PF) degradation. In one example, method 300 may adjust fuel injection timing to reduce particulate formation within the engine the next time the engine is started and combusting fuel. Further, method 300 may initiate particulate filter regeneration the next time the engine is started and combusting fuel. The particulate filter may be regenerated via adjusting spark timing and fuel injection timing. By regenerating the particulate filter it may be possible to reduce the possibility of operating the engine at higher back pressures until the particulate filter and particulate filter differential pressure sensor may be serviced. Method 300 proceeds to exit.

At 316, method 300 adjusts the engine to prevent air flow through engine cylinders. In one example, the position of the engine may be adjusted so that none of the engine's cylinders intake and exhaust valves are simultaneously open. Thus, air flow through each cylinder may be prevented by fully closed intake or exhaust valves. The engine may be rotated to a position where none of the engine's cylinders intake and exhaust valves are simultaneously open. Alternatively, intake and/or exhaust valves may be commanded closed simultaneously via variable valve actuators to prevent air to flow through the engine's cylinders. Method 300 also fully opens the EGR valve so that air is allowed to flow through the EGR passage. Method 300 proceeds to 318.

At 318, method 300 judges if EGR differential pressure sensor output indicates zero flow and if particulate filter differential pressure sensor output is non-zero (e.g., indicates flow through the particulate filter). In one example, flow through the EGR passage as determined from the differential pressure sensor may be estimated via the following equation:

$$\dot{m} = KA_2\sqrt{2\rho(p1-p2)}$$

where $\dot{m}$ is the mass flow rate through the EGR passage, K is a predetermined flow coefficient for a sharp edge orifice, $A_2$ is the area of the orifice, $\rho$ is the density of air, p1 is pressure upstream of the orifice, and p2 is pressure downstream of the orifice. If method 300 judges that EGR differential pressure sensor output indicates zero flow and particulate filter differential pressure sensor output is non-zero, then the answer is yes and method 300 proceeds to 380. Otherwise, the answer is no and method 300 proceeds to 320.

At 380, method 300 indicates EGR differential pressure sensor degradation. In other words, method 300 indicates that the sensor that observes flow through the EGR passage is degraded. Method 300 may indicate EGR differential pressure sensor degradation via displaying a message on a human/machine interface, changing a value of a variable stored in controller memory, or via other known ways. Method 300 proceeds to 384.

At 384, method 300 adjusts engine operation responsive to an indication of EGR sensor degradation or EGR system mechanical degradation the next time the engine is started and combusting fuel. In one example, method 300 may adjust spark timing and fuel injection timing to reduce NOx formation within the engine. Further, method 300 may command the EGR valve to an open loop position without use of feedback, or alternatively, method 300 may deactivate the EGR valve and retard engine spark timing. Method 300 proceeds to exit.

At 320, method 300 judges if EGR differential pressure sensor output indicates zero flow and if particulate filter differential pressure sensor output indicates zero flow. If method 300 judges that EGR differential pressure sensor output indicates zero flow and particulate filter differential pressure sensor output indicates zero flow, then the answer is yes and method 300 proceeds to 382. Otherwise, the answer is no and method 300 proceeds to 322.

At 382, method 300 indicates EGR system mechanical degradation (e.g., EGR valve degradation). Method 300 may indicate EGR system mechanical degradation via displaying a message on a human/machine interface, changing a value of a variable stored in controller memory, or via other known ways. Method 300 proceeds to 384.

At 322, method 300 adjusts the speed of the electrically driven turbocharger. In one example, the speed of the electrically driven turbocharger is decreased and then increased to determine if flow through the EGR passage matches or correlates to flow through the particulate filter. Method 300 proceeds to 324.

At 324, method 300 judges if a flow estimate from the particulate filter differential pressure sensor output follows or correlates with a flow estimate from the EGR differential pressure sensor output. For example, method 300 may determine if the flow estimate from the particulate filter differential pressure sensor output is substantially equal to (within ±5% of the flow estimate from the EGR differential pressure sensor) the flow estimate from the EGR differential pressure sensor output. If method 300 judges that the flow estimate from the particulate filter differential pressure sensor output correlates with the flow estimate from the EGR differential pressure sensor output, then the answer is yes and method 300 proceeds to 330. Otherwise, the answer is no and method 300 proceeds to 326.

At 330, method 300 indicates that the EGR differential pressure sensor is not degraded. Method 300 may indicate EGR differential pressure sensor is not degraded via displaying a message on a human/machine interface, changing a value of a variable stored in controller memory, or via other known ways. Method 300 proceeds to 332.

At 332, method 300 adjusts engine operation responsive to the indication that the EGR differential pressure sensor is not degraded the next time the engine is started and combusting fuel. In one example, method 300 adjusts a position of the EGR valve responsive to a flow estimate determined from output of the EGR differential pressure sensor. Method 300 proceeds to exit.

At 326, method 300 indicates that the EGR differential pressure sensor is degraded. Method 300 may indicate EGR differential pressure sensor is degraded via displaying a message on a human/machine interface, changing a value of a variable stored in controller memory, or via other known ways. Method 300 proceeds to 328.

At 328, method 300 adjusts engine operation responsive to an indication of EGR sensor degradation the next time the engine is started and combusting fuel. In one example, method 300 may adjust spark timing and fuel injection timing to reduce NOx formation within the engine. Further, method 300 may command the EGR valve to an open loop position without use of feedback, or alternatively, method 300 may deactivate the EGR valve and retard engine spark timing. Method 300 proceeds to exit.

At 340, method 300 judges if an engine stop is requested and if the transmission is engaged in park. In one example, an engine stop may be requested via a human driver providing input to a key switch, pushbutton, or other human/machine interface that has a sole purpose of requesting an engine stop or start. Alternatively, an autonomous driver may request an engine stop via adjusting a value of a variable in controller memory. Similarly, method 300 may judge if the vehicle's transmission is engaged in park via determining a position of a shifter via a sensor. If method 300 judges that an engine stop is requested and the vehicle's transmission is engaged in park, the answer is yes and method 300 proceeds to 342. Otherwise, the answer is no and method 300 proceeds to 370.

At 370, method 300 operates the engine (e.g., combusts fuel in the engine) and adjusts a position of the engine's EGR valve responsive to engine speed, engine load, and feedback from the EGR system. For example, the EGR valve may be commanded to a position to provide a desired EGR flow rate, and then the position of the valve may be adjusted responsive to an observed or measured flow rate of EGR through the EGR passage. The observed rate of EGR flow may be determined from output of the EGR differential pressure sensor. Method 300 proceeds to exit after adjusting engine operation.

At 342, method 300 adjusts the engine to allow air flow through engine cylinders. In one example, the position of the engine may be adjusted so that one or more of the engine's cylinders intake and exhaust valves are simultaneously open to allow air to flow through the cylinder and out the exhaust system. The engine may be rotated to a position where at least one or more engine cylinder's intake and exhaust valves are simultaneously open. Alternatively, intake and/or exhaust valves may be commanded open simultaneously via variable valve actuators to allow air to flow through the engine's cylinders. Method 300 also fully closes the EGR valve so that air is not allowed to flow through the EGR passage. Method 300 proceeds to 344.

At 344, method 300 activates the electrically driven compressor. The wastegate may be opened and the electrically driven compressor activated in response to a human driver remotely requesting an engine start, a predetermined amount of time since the engine was most recently stopped (e.g., not combusting fuel), or via a request from an autonomous controller. The electrically driven compressor may be commanded to a speed that provides a threshold amount of air flow through the engine. Method 300 proceeds to 346.

At 346, method 300 judges if air flow from the electrically driven compressor is detected through the particulate filter via the particulate filter differential pressure sensor. Flow through the particulate filter may be determined in a variety of ways from output of the particulate filter differential pressure sensor. In one example, flow through the particulate filter may be estimated via the following equation:

$$PF_{flow} = f(\Delta P, T, SL, \rho)$$

where $PF_{flow}$ is the estimated flow rate of air through the particulate filter; f is a function with arguments $\Delta P$, T, SL, and $\rho$; $\Delta P$ is pressure drop across the particulate filter, T, is air temperature, SL is the estimated soot load in the particulate filter, and $\rho$ is the density of air. Alternatively, flow through the particulate filter may be determined as a face velocity of a particulate filter $U_f$ using $\Delta P$ as is described in U.S. Pat. No. 8,069,658, which is hereby fully incorporated by reference for all intents and purposes. If method 300 detects flow through the particulate filter, the answer is yes and method 300 proceeds to 348. Otherwise, the answer is no and method 300 proceeds to 375.

At 375, method 300 indicates particulate filter flow sensor degradation. Further, method 300 may indicate possible electrically driven compressor degradation since no flow was detected at the particulate filter. Method 300 may indicate particulate filter flow sensor degradation via displaying a message on a human/machine interface, changing a value of a variable stored in controller memory, or via other known ways. Method 300 proceeds to 376.

At 376, method 300 adjusts engine operation responsive to the indication of particulate filter (PF) degradation the next time the engine is started and combusting fuel. In one example, method 300 may adjust fuel injection timing to reduce particulate formation within the engine. Further, method 300 may initiate particulate filter regeneration the next time the engine is started and combusting fuel. The particulate filter may be regenerated via adjusting spark timing and fuel injection timing. By regenerating the particulate filter it may be possible to reduce the possibility of operating the engine at higher back pressures until the particulate filter and particulate filter differential pressure sensor may be serviced. Method 300 proceeds to exit.

At 348, method 300 adjusts the engine to prevent air flow through engine cylinders. In one example, the position of the engine may be adjusted so that none of the engine's cylinders intake and exhaust valves are simultaneously open. Thus, air flow through each cylinder may be prevented by fully closed intake or exhaust valves. The engine may be rotated to a position where none of the engine's cylinders intake and exhaust valves are simultaneously open. Alternatively, intake and/or exhaust valves may be commanded closed simultaneously via variable valve actuators to prevent air to flow through the engine's cylinders. Method 300 also fully opens the EGR valve so that air is allowed to flow through the EGR passage. Method 300 proceeds to 350.

At 350, method 300 judges if EGR differential pressure sensor output indicates zero flow and if particulate filter differential pressure sensor output is non-zero (e.g., indicates flow through the particulate filter). In one example, flow through the EGR passage as determined from the differential pressure sensor may be estimated via the following equation:

$$\dot{m} = KA_2\sqrt{2\rho(p1-p2)}$$

where $\dot{m}$ is the mass flow rate through the EGR passage, K is a predetermined flow coefficient for a sharp edge orifice, $A_2$ is the area of the orifice, $\rho$ is the density of air, p1 is pressure upstream of the orifice, and p2 is pressure downstream of the orifice. If method 300 judges that EGR differential pressure sensor output indicates zero flow and particulate filter differential pressure sensor output is non-zero, then the answer is yes and method 300 proceeds to 390. Otherwise, the answer is no and method 300 proceeds to 352.

At 390, method 300 indicates EGR differential pressure sensor degradation. In other words, method 300 indicates that the sensor that observes flow through the EGR passage is degraded. Method 300 may indicate EGR differential pressure sensor degradation via displaying a message on a human/machine interface, changing a value of a variable stored in controller memory, or via other known ways. Method 300 proceeds to 394.

At 394, method 300 adjusts engine operation responsive to an indication of EGR sensor degradation or EGR system mechanical degradation the next time the engine is started and combusting fuel. In one example, method 300 may adjust spark timing and fuel injection timing to reduce NOx formation within the engine. Further, method 300 may command the EGR valve to an open loop position without use of feedback, or alternatively, method 300 may deactivate the EGR valve and retard engine spark timing. Method 300 proceeds to exit.

At 352, method 300 judges if EGR differential pressure sensor output indicates zero flow and if particulate filter differential pressure sensor output indicates zero flow. If method 300 judges that EGR differential pressure sensor output indicates zero flow and particulate filter differential pressure sensor output indicates zero flow, then the answer is yes and method 300 proceeds to 392. Otherwise, the answer is no and method 300 proceeds to 354.

At 392, method 300 indicates EGR system mechanical degradation (e.g., EGR valve degradation). Method 300 may indicate EGR system mechanical degradation via displaying a message on a human/machine interface, changing a value of a variable stored in controller memory, or via other known ways. Method 300 proceeds to 394.

At 354, method 300 adjusts the speed of the electrically driven compressor. In one example, the speed of the electrically driven compressor is decreased and then increased to determine if flow through the EGR passage matches or correlates to flow through the particulate filter. Method 300 proceeds to 356.

At 356, method 300 judges if a flow estimate from the particulate filter differential pressure sensor output follows or correlates with a flow estimate from the EGR differential pressure sensor output. For example, method 300 may determine if the flow estimate from the particulate filter differential pressure sensor output is substantially equal to (within ±5% of the flow estimate from the EGR differential pressure sensor) the flow estimate from the EGR differential pressure sensor output. If method 300 judges that the flow estimate from the particulate filter differential pressure sensor output correlates with the flow estimate from the EGR differential pressure sensor output, then the answer is yes and method 300 proceeds to 362. Otherwise, the answer is no and method 300 proceeds to 358.

At 362, method 300 indicates that the EGR differential pressure sensor is not degraded. Method 300 may indicate EGR differential pressure sensor is not degraded via displaying a message on a human/machine interface, changing a value of a variable stored in controller memory, or via other known ways. Method 300 proceeds to 364.

At 364, method 300 adjusts engine operation responsive to the indication that the EGR differential pressure sensor is not degraded the next time the engine is started and combusting fuel. In one example, method 300 adjusts a position of the EGR valve responsive to a flow estimate determined from output of the EGR differential pressure sensor. Method 300 proceeds to exit.

At 358, method 300 indicates that the EGR differential pressure sensor is degraded. Method 300 may indicate EGR differential pressure sensor is degraded via displaying a message on a human/machine interface, changing a value of a variable stored in controller memory, or via other known ways. Method 300 proceeds to 360.

At 360, method 300 adjusts engine operation responsive to an indication of EGR sensor degradation the next time the engine is started and combusting fuel. In one example, method 300 may adjust spark timing and fuel injection timing to reduce NOx formation within the engine. Further, method 300 may command the EGR valve to an open loop position without use of feedback, or alternatively, method 300 may deactivate the EGR valve and retard engine spark timing. Method 300 proceeds to exit.

In these ways, method 300 may diagnose the presence or absence of EGR system degradation including flow sensor degradation and mechanical degradation. The method may be applied to engines having electric turbochargers and engines having electrically driven compressors that are not turbocharged.

Thus, the method 300 provides for an engine operating method, comprising: increasing air flow through an engine that is not rotating via a controller in response to a request to diagnose operation of an exhaust gas recirculation (EGR) system. The controller may request an EGR diagnostic responsive to vehicle operating conditions. The engine method includes where increasing air flow through the engine includes activating an electrically driven compressor. The engine method includes where the electrically driven compressor is included in a turbocharger. The engine method further comprises: requesting to diagnose operation of the EGR valve; and commanding open an EGR valve in response to the request to diagnose operation of the EGR system. The engine method further comprises indicating degradation of the EGR system via the controller based on output of a first differential pressure sensor and output of a second differential pressure sensor. The engine method includes where the first differential pressure sensor is configured to sense a pressure difference across an orifice. The engine method includes where the first differential pressure sensor is configured to sense a pressure difference across a particulate filter. The engine method includes where the indication of EGR system degradation is displayed at a human/machine interface.

Method 300 also provides for an engine operating method, comprising: adjusting an engine via a controller so that intake and exhaust valves of at least one cylinder are simultaneously open while the engine is not rotating; increasing air flow through the engine via a controller; and adjusting the engine via the controller so that intake or exhaust valves of each engine cylinder are fully closed in response to air flow being sensed through a particulate filter. The controller may sense air flow through the particulate filter via the particulate filter differential pressure sensor. The engine method further comprises sensing air flow through the particulate filter and opening an exhaust gas recirculation (EGR) valve in response to the air flow being sensed through the particulate filter. The engine method further comprises sensing the air flow through the EGR valve and indicating EGR system degradation in response to an absence of air flow being detected through the EGR valve. The engine method further comprises indicating EGR system degradation in response to an absence of air flow being sensed through the particulate filter. The controller may also sense presence or an absence of flow through EGR passage via the EGR differential pressure sensor output. The engine method includes where air flow through the engine is increased via the controller activating an electrically driven turbocharger. The engine method includes where the air flow through the engine is increased via the controller activating an electrically driven compressor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
increasing air flow through an engine that is not rotating via a controller in response to a request to diagnose operation of an exhaust gas recirculation (EGR) system.

2. The engine method of claim 1, where increasing air flow through the engine includes activating an electrically driven compressor.

3. The engine method of claim 2, where the electrically driven compressor is included in a turbocharger.

4. The engine method of claim 1, further comprising:
requesting to diagnose operation of an EGR valve; and
commanding open the EGR valve in response to the request to diagnose operation of the EGR system.

5. The engine method of claim 1, further comprising indicating degradation of the EGR system via the controller based on output of a first differential pressure sensor and output of a second differential pressure sensor.

6. The engine method of claim 5, where the first differential pressure sensor is configured to sense a pressure difference across an orifice.

7. The engine method of claim 5, where the first differential pressure sensor is configured to sense a pressure difference across a particulate filter.

8. The engine method of claim 5, where the indication of EGR system degradation is displayed at a human/machine interface.

9. An engine operating method, comprising:
adjusting an engine via a controller so that intake and exhaust valves of at least one cylinder are simultaneously open while the engine is not rotating;
increasing air flow through the engine via a controller; and
adjusting the engine via the controller so that intake or exhaust valves of each engine cylinder are fully closed in response to air flow being sensed through a particulate filter.

10. The engine method of claim 9, further comprising sensing air flow through the particulate filter and opening an exhaust gas recirculation (EGR) valve in response to the air flow being sensed through the particulate filter.

11. The engine method of claim 10, further comprising sensing the air flow through the EGR valve and indicating EGR system degradation in response to an absence of air flow being detected through the EGR valve.

12. The engine method of claim 9, further comprising indicating EGR system degradation in response to an absence of air flow being sensed through the particulate filter.

13. The engine method of claim 9, where air flow through the engine is increased via the controller activating an electrically driven turbocharger.

14. The engine method of claim 9, where the air flow through the engine is increased via the controller activating an electrically driven compressor.

15. An engine system, comprising:
an engine including a plurality of cylinders, a plurality of valve deactivating actuators and an exhaust gas recirculating (EGR) system;
an electrically driven compressor; and
a controller including executable instructions stored in non-transitory memory to increase air flow through the engine via the electrically driven compressor while the engine is not rotating via the controller in response to a request to diagnose the EGR system.

16. The engine system of claim 15, further comprising additional instructions to close an EGR valve and adjust the engine to allow air flow through one or more of the plurality of cylinders via the controller in response to the request to diagnose the EGR system.

17. The engine system of claim 16, further comprising additional instructions to open the EGR valve and adjust the engine to prevent air flow through the plurality of cylinders via the controller in response to air flow being detected through a particulate filter while the intake and exhaust valves of the at least one cylinder are simultaneously open and the engine is not rotating.

18. The engine system of claim 17, further comprising additional instructions to adjust the plurality of valve deactivating mechanisms to prevent air flow through the plurality of cylinders via the controller.

19. The engine system of claim 16, further comprising additional instructions to adjust engine operation via the controller in response to EGR system degradation determined via the controller.

20. The engine system of claim 19, where adjust engine operation includes retarding spark timing or adjusting fuel injection timing.

* * * * *